US012184648B2

(12) United States Patent
Gundavelli et al.

(10) Patent No.: US 12,184,648 B2
(45) Date of Patent: *Dec. 31, 2024

(54) MEDIA ACCESS CONTROL (MAC) ADDRESS ANONYMIZATION BASED ON ALLOCATIONS BY NETWORK CONTROLLER ELEMENTS

(71) Applicant: Cisco Technology, Inc., San Jose, CA (US)

(72) Inventors: Srinath Gundavelli, San Jose, CA (US); Shree N. Murthy, San Jose, CA (US); Pradeep Kumar Kathail, Los Altos, CA (US); Brian Weis, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/167,593

(22) Filed: Feb. 10, 2023

(65) Prior Publication Data

US 2023/0188523 A1      Jun. 15, 2023

Related U.S. Application Data

(63) Continuation of application No. 17/307,446, filed on May 4, 2021, now Pat. No. 11,611,557, which is a
(Continued)

(51) Int. Cl.
*H04L 9/40*      (2022.01)
*H04L 47/2441*   (2022.01)
(Continued)

(52) U.S. Cl.
CPC ...... *H04L 63/0876* (2013.01); *H04L 47/2441* (2013.01); *H04L 63/0892* (2013.01);
(Continued)

(58) Field of Classification Search
CPC ............. H04L 47/2411; H04L 63/0876; H04L 63/0892; H04L 63/1475; H04L 63/0414;
(Continued)

(56) References Cited

U.S. PATENT DOCUMENTS 6,148,067 A * 11/2000 Leipow ............. H04M 3/42008
370/259
9,450,868 B2    9/2016 Anantharam et al.
(Continued)

FOREIGN PATENT DOCUMENTS

CN           102209123 A      10/2011

OTHER PUBLICATIONS

Volz B., et al., "Link-Layer Addresses Assignment Mechanism for DHCPv6," draft-bvtm-dhc-mac-assign-02, Dynamic Host Configuration (DHC), Oct. 20, 2018, 16 Pages.
(Continued)

*Primary Examiner* — Stephen J Clawson
(74) *Attorney, Agent, or Firm* — Edell, Shapiro & Finnan, LLC

(57) ABSTRACT

A method is provided to anonymize the media access control (MAC) address of a client device. The method involves generating a plurality of media access control (MAC) addresses for use by a client device in a network. Policies are defined that determine which one of the plurality of MAC addresses is to be used by the client device. The plurality of MAC addresses allocated for use by the client device are registered with a management entity in the network.

20 Claims, 10 Drawing Sheets

Related U.S. Application Data continuation of application No. 16/260,455, filed on Jan. 29, 2019, now Pat. No. 11,050,746.

(51) Int. Cl.
  *H04L 65/1073* (2022.01)
  *H04W 80/02* (2009.01)

(52) U.S. Cl.
  CPC ...... *H04L 63/1475* (2013.01); *H04L 65/1073* (2013.01); *H04W 80/02* (2013.01)

(58) Field of Classification Search
  CPC .. H04L 63/162; H04L 65/1073; H04W 80/02; H04W 12/02; H04W 12/06
  See application file for complete search history.

(56) References Cited

U.S. PATENT DOCUMENTS

| | | | |
|---|---|---|---|
| 9,584,471 | B2 | 2/2017 | Raman et al. |
| 10,277,553 | B2 | 4/2019 | Correll |
| 10,454,887 | B2 | 10/2019 | Weis et al. |
| 2003/0219023 | A1 | 11/2003 | Miyata et al. |
| 2004/0106433 | A1* | 6/2004 | Ooki ................ H04W 4/24 455/561 |
| 2005/0286503 | A1* | 12/2005 | Oda ................ H04L 61/50 370/395.2 |
| 2006/0013224 | A1 | 1/2006 | Chiba |
| 2007/0276897 | A1 | 11/2007 | Tameshige et al. |
| 2007/0288653 | A1 | 12/2007 | Sargor et al. |
| 2008/0198746 | A1* | 8/2008 | Kwan ................ H04L 47/263 370/231 |
| 2009/0290537 | A1 | 11/2009 | Berglund et al. |
| 2010/0082799 | A1 | 4/2010 | DeHaan et al. |
| 2010/0162241 | A1 | 6/2010 | Koma |
| 2011/0066756 | A1 | 3/2011 | Kakumuru |
| 2012/0076072 | A1 | 3/2012 | Jalfon et al. |
| 2013/0077529 | A1 | 3/2013 | Lueckenhoff et al. |
| 2013/0258899 | A1* | 10/2013 | Anantharam ...... H04L 45/745 370/254 |
| 2014/0071969 | A1* | 3/2014 | Roeland ............ H04W 76/11 370/338 |
| 2014/0344424 | A1 | 11/2014 | Sato |
| 2016/0135041 | A1 | 5/2016 | Lee et al. |
| 2016/0135053 | A1 | 5/2016 | Lee et al. |
| 2017/0142064 | A1* | 5/2017 | Weis ................ H04L 63/061 |
| 2017/0171831 | A1 | 6/2017 | Seigel et al. |
| 2018/0077742 | A1 | 3/2018 | Pang |
| 2019/0075130 | A1 | 3/2019 | Petry et al. |
| 2019/0334886 | A1 | 10/2019 | Lelcuk et al. |
| 2020/0145498 | A1 | 5/2020 | Grayson et al. |
| 2020/0244653 | A1 | 7/2020 | Eichelberger et al. |

OTHER PUBLICATIONS

Roger Marks, "Local MAC Addresses in the Overview and Architecture based on IEEE Std 802c", doc.: IEEE 802.11-17/1466r01, Sep. 13, 2017, 41 pages.

IEEE Computer Society, "IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 5: Preassociation Discovery," IEEE Std 802.11aq, Jun. 14, 2018, 69 pages.

Jeremy Martin et al., "A Study of MAC Address Randomization in Mobile Devices and When it Fails", Proceedings on Privacy Enhancing Technologies ; 2017 (4):268-286, Feb. 28, 2017, 19 pages.

Michael Johas Teener, "CSD for P802.1CQ Local Address assignment protocol", IEEE 802.1 Local Address Study Group, Sep. 10, 2015, 9 pages.

Fan Zhang et al., "Defending Against Traffic Analysis in Wireless Networks Through Traffic Reshaping", 2011 31st International Conference on Distributed Computing Systems, Jun. 20-24, 2011, DOI 10.1109/ICDCS.2011.77, 11 pages.

Marco Gruteser et al., "Enhancing Location Privacy in Wireless LAN Through Disposable Interface Identifiers: A Quantitative Analysis", ACM 1-58113-768-0/03/0009, WMASH'03, Sep. 19, 2003, 10 pages.

B. Volz et al., "Link-Layer Addresses Assignment Mechanism for DHCPv6," draft-bvtm-dhc-mac-assign-00, Dynamic Host Configuration (DHC), Mar. 5, 2018, 16 pages.

R. Vijayakumar et al., "Prevention of Multiple Spoofing Attacks with Dynamic MAC Address Allocation for Wireless Networks", 978-1-4799-3358-7/14, International Conference on Communication and Signal Processing, Apr. 3-5, 2014, 5 pages.

Jeremy Martin et al., "A Study of MAC Address Randomization in Mobile Devices and When it Fails", arXiv:1703.02874v2 [cs.CR], Mar. 31, 2017, 23 pages.

A. Cooper et al., "Privacy Considerations for Internet Protocols", RFC 6973, Internet Architecture Board (IAB), Jul. 2013, 36 pages.

R. Winter et al., "Privacy Considerations for Protocols Relying on IP Broadcast or Multicast", Internet Engineering Task Force (IETF), RFC 8386, May 2018, 13 pages.

\* cited by examiner

MEDIA ACCESS CONTROL (MAC) ADDRESS ANONYMIZATION BASED ON ALLOCATIONS BY NETWORK CONTROLLER ELEMENTS

CROSS-REFERENCE TO RELATED APPLICATIONS

This application is a continuation of U.S. patent application Ser. No. 17/307,446 filed on May 4, 2021, which is a continuation of U.S. patent application Ser. No. 16/260,455 filed on Jan. 29, 2019 (U.S. Pat. No. 11,050,746), the contents of which are hereby incorporated by reference in their entireties.

TECHNICAL FIELD

The present disclosure relates to privacy of network communications.

BACKGROUND

With the adoption of the new General Data Protection Regulation (GDPR) and other local regulations, network operators are required to protect the privacy of users and their personal data. This regulation contains provisions and requirements pertaining to the handling of personally identifiable information (PII) of individuals inside the European Union, and applies to all enterprises, regardless of location, involved in doing business with the European Economic Area. Both enterprises and service providers are required to comply with this regulation, which in turn places some stringent new requirements, prohibiting the exposure of PII of any user in the networking equipment that vendors supply.

DESCRIPTION OF EXAMPLE EMBODIMENTS

Overview

Figure 1:
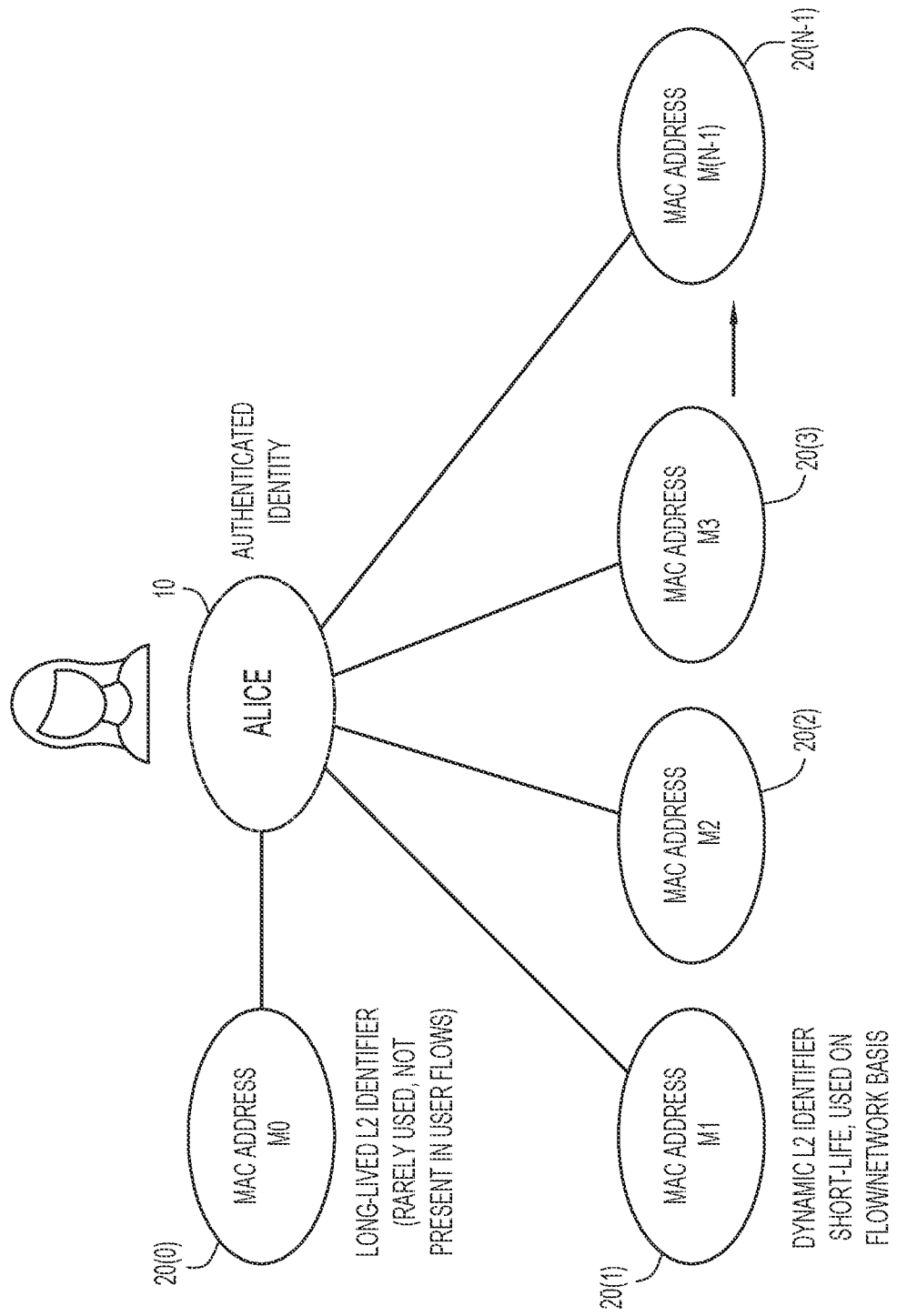
FIG. 1 is diagram illustrating allocation of a plurality of short-lived Media Access Control (MAC) addresses to an authenticated entity associated with a client device for purposes of achieving MAC address anonymization, according to an example embodiment.

In one embodiment, a method is provided to anonymize the media access control (MAC) address of a client device. The method involves generating a plurality of media access control (MAC) addresses allocated for use by a client device in a network. Policies are defined that determine which one of the plurality of MAC addresses is to be used by the client device. The plurality of MAC addresses allocated for use by the client device are registered with a management entity in the network.

Example Embodiments

In order to comply with government regulations, such as the General Data Protection Regulation (GDPR) in the European Union (EU), data protection needs to be ensured at all networking levels, as outlined in IEEE 802E and IETF RFC 6973. Methods are presented herein to address the exposure of one of the key PII elements, the fixed media access control (MAC) address of a networking client. A fixed MAC address can lead to the identification of a user through the user's device, and it can also lead to correlation of that user's network profile over time and around the world. These resulting vulnerabilities can cause non-compliance to the GDPR and other country specific regulations.

Exposure of a stable Layer-2 identifier, such as a 48-bit globally unique MAC address, in the ever-expanding Layer-2 domain, is a known problem and now there are efforts to correct this vulnerability. One method has now been standardized in a recently-approved IEEE 802.11aq amendment to IEEE 802.11. But, while IEEE 802.11aq offers privacy during the network scanning-phase of a wireless client, it falls short because the user's traffic still carries an immutable MAC address, allowing the user traffic to be tracked by an eavesdropper in that Layer-2 domain, using commonly known attack vectors.

Accordingly, presented herein is an approach for eliminating the use of an immutable MAC addresses in user's IP packets. This goes with the implicit assumption that all the other control plane interfaces are secured, such as those used for Authentication, Authorization, and Accounting (AAA) where the client's MAC address and authenticated identity related attribute-value pairs (AVPs) are carried in protocol messages that are protected by a confidentiality method.

Privacy Threats to be Mitigated

The following describes scenarios to which the techniques presented herein may be useful.

Alice is talking to Bob over a Voice over Internet Protocol (VoIP) call, and Alice may also talk to Charlie on another call later. Since Alice is using the same MAC address (M1), an eavesdropper (Eve) will be able to establish that Alice made both phone calls.

Alice is using MAC M1, and is associated to an access point AP-1 at 9 AM and is associated to AP-2 at 11 AM. Eve would be able to detect that Alice has moved and could know Alice's location by watching the movement of the MAC address that Alice is using.

Alice may use an Internet Protocol version 6 (IPv6) client that uses IPv6 Stateless Address Autoconfiguration, which creates Extended Unique Identifier (EUI-64) IPv6 addresses based on Alice's 48-bit MAC address. IPv6 Stateless Address Autoconfiguration may generate multiple IPv6 addresses for each of the prefixes. However, when the identifier in the IPv6 address is based on the 48-bit MAC address, the generated addresses will have the same 64-bits and Eve can still correlate Alice's traffic and identify it with Alice.

Presented herein are 3 approaches that may have different implementation costs and complexity, but all of these approaches eliminate the exposure of the PII elements of a user. For example, the first two approaches have an impact on the Wi-Fi® wireless local area network (WLAN) client insofar as the client will use an updated/modified IEEE 802.11 driver, whereas the third approach can work with legacy unmodified Wi-Fi clients. In all of these approaches, the MAC address used for client traffic is a dynamically allocated and thus short-lived MAC address. When the client terminates a session with the short-lived MAC address, that MAC address is freed up for use by other clients, and thus can no longer be correlated to the same client.

The techniques presented herein are not limited to use in a WLAN, and more generally are applicable to a network environment in which a client device (wired or wireless) can connect to the network at one or more access points (WLAN access point or wired access point, e.g., an network switch).

Reference is first made to FIG. 1. FIG. 1 shows an authenticated identity Alice at reference numeral 10. According to the approaches presented herein, a set of a plurality of (short-lived) MAC addresses 20(0), 20(1), 20(2) and 20(3), . . . , 20(N−1), are generated/allocated that are associated with authenticated identity Alice. MAC Address M0 is a long-lived Layer-2 identifier (that is rarely used), whereas MAC addresses M1 at 20(1), M2 at 20(2), M3 at 20(3) and M(N−1) at 20(N−1) are dynamic Layer-2 identifiers that have a relatively short-life and may be used on a flow/network/application basis, as described further hereinafter.

Figure 2:
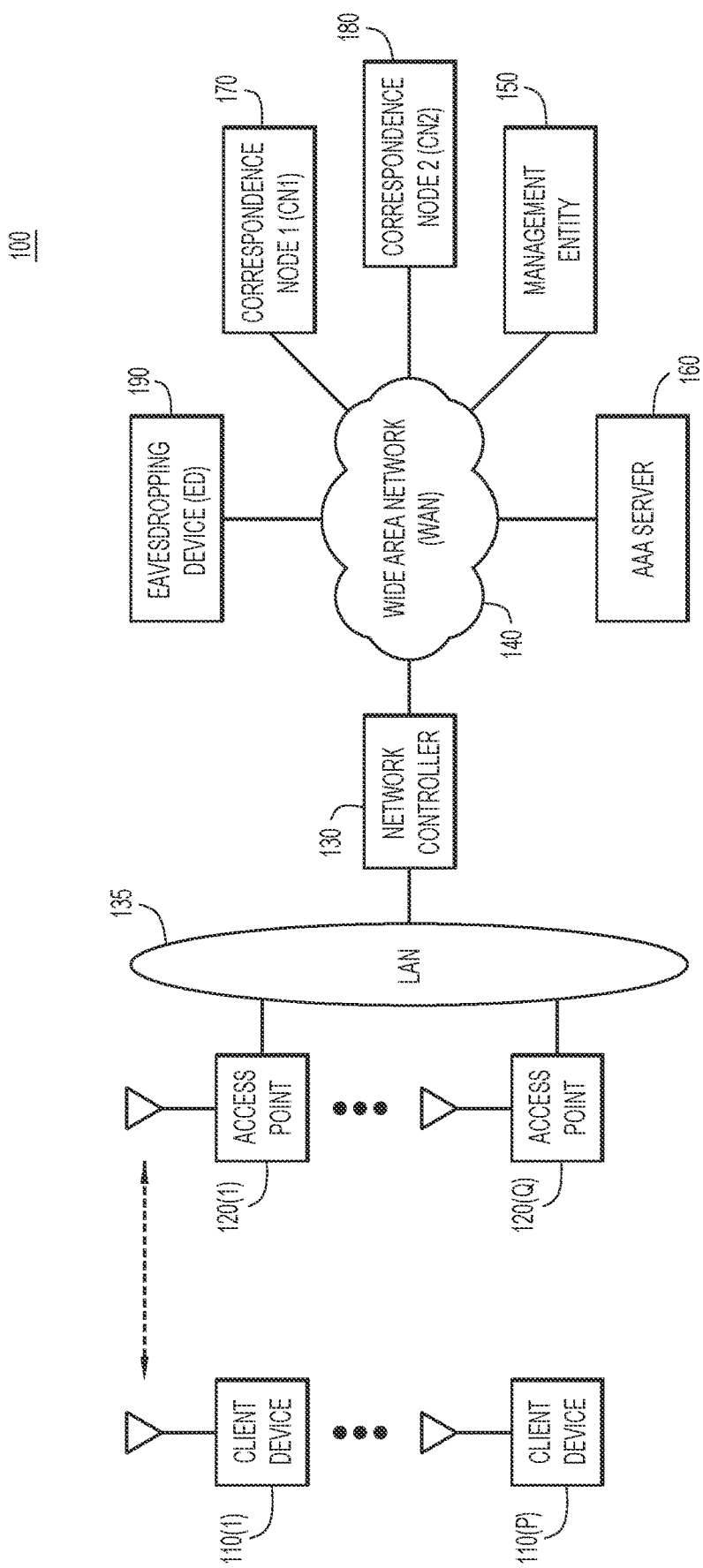
FIG. 2 is a block diagram of a network environment in which techniques for MAC address anonymization may be implemented, according to an example embodiment.

Reference is now made to FIG. 2, which shows an example network environment 100 in which the techniques presented herein may be used. Network environment 100 includes one or more client devices 110(1)-110(P), one or more access points (APs) 120(1)-120(Q), a network 130 connected to a local area network 135 to which the APs 120(1)-120(Q) are connected, and a wide area network ((WAN), e.g., the Internet) 140. The network controller 130 is also connected to the WAN 140. A management entity 150 is provided that performs operations related to the management of (and in some cases also the generation of) the set of MAC addresses allocated to a client device. FIG. 2 also shows an AAA server 160, a first correspondence node (CN1) 170, a second correspondence node (CN2) 180 and an eavesdropping device (ED) 190. The management entity 150, AAA server 160, CN1 170, CN2 180 and ED 190 all have connectivity to the WAN 140.

While the figures and description herein refer to the client devices as wireless client devices and the access points as wireless access points, again this is not meant to limiting. The techniques presented herein are applicable to both wired and wireless client devices. In the case in which the client devices are wireless, e.g., Wi-Fi capable client devices, then the APs are wireless (e.g., Wi-Fi capable) APs, and the network controller 130 may be a wireless local area network (WLAN) controller (WLC). However, in the case in which the client device devices are wired devices, then the APs may be network switches to which the client devices connect by a network cable. Thus, the term "access point" or "AP" is not to be limited to a wireless access point device, and the term "client device" is not to be limited to a wireless (Wi-Fi capable) client device.

The management entity 150 generates and/or manages the MAC addresses. For example, in one embodiment, the management entity 150 generates the set of MAC provided to a given client, and may define the policies for how each MAC address is to be used by the client. The management entity 150 may be an application running on a server in the cloud, or may reside on any control entity in the network, such as the network controller 130.

The MAC anonymization capability presented herein can be enabled/disabled on a LAN segment, AP or application basis. For example, if all the traffic anticipated for a given LAN segment is to be internal to an enterprise network, then it may not be necessary to enable this MAC anonymization capability.

Approach-1: Network-Assigned Dynamic MAC Address Usage

Figure 3A:
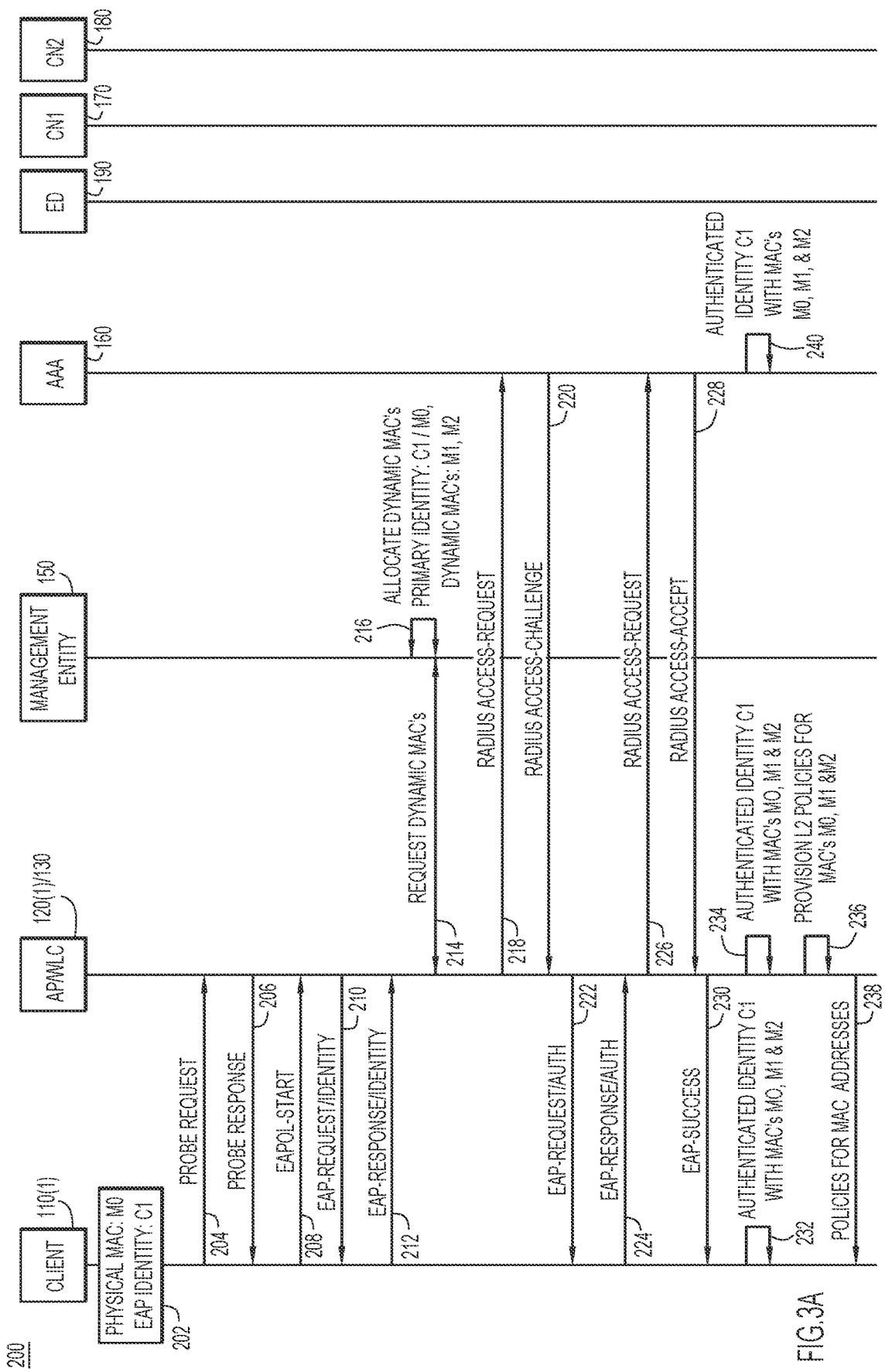
FIGS. 3A and 3B illustrate a sequence diagram associated with a first approach for MAC address anonymization, according to an example embodiment.
Figure 3B:
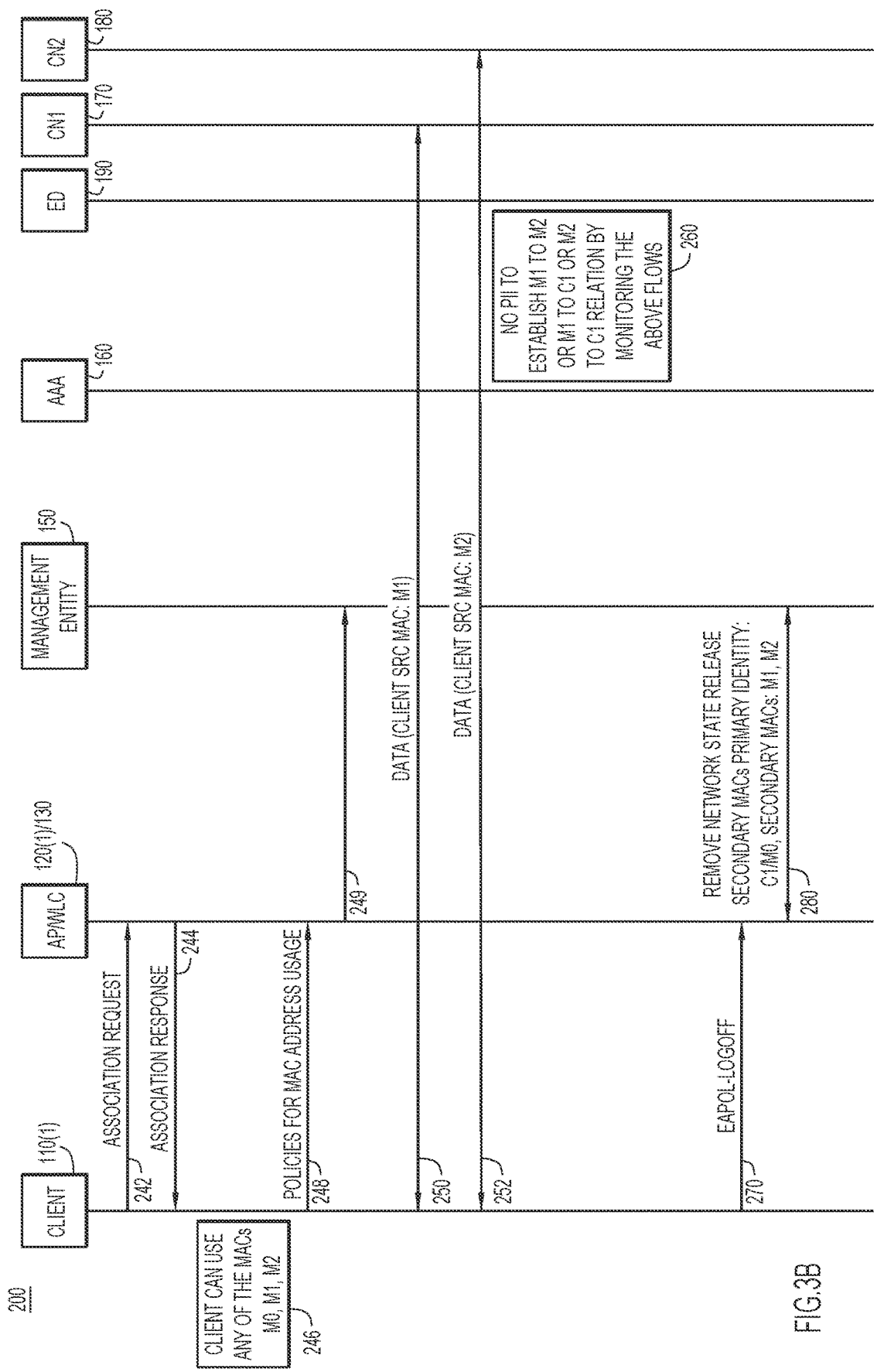

Reference is now made to FIGS. 3A and 3B for a description of a process 200 of a first approach to MAC anonymization in accordance with an example embodiment. Reference is also made to FIG. 2 for purposes of the description of FIGS. 3A and 3B.

In this approach, an entity in the network assigns a set of MAC addresses to a client device as part of the authorization/authentication procedures. The set of MAC addresses could be any MAC address with the local bit set (e.g., "random" selected MAC addresses), or the MAC addresses could be allocated using the Structured Local Address Plan (SLAP) methods of IEEE 802c.

The network elements (APs 120(1)-120(Q), WLC 130 and AAA server 160) have the authenticated identity of a given client, and the dynamically allocated MAC addresses. The relation establishing an association between the authenticated identity (C1) and the allocated MAC addresses (M0, M1, M2, . . . , M(N−1)), {C1, {M0, M1, M2, . . . M(N−1)}}, is present at the client, AP, WLC and AAA elements.

For purposes of the description of this approach, the client device 110(1) is attempting a connection and authentication via AP 120(1) and WLC 130 to communicate in the network. Client receives a set of MAC addresses in a secure envelope from a central entity in the network, such as the management entity 150, as part of initial Layer (L2) authentication (with a default MAC address M0 for client device 110(1)) with the network. Because those MAC addresses are secured/encrypted as part of the initial L2 authentication, no other entity can see those MAC addresses. The AP 120(1) has authorized all of those MAC addresses (M0, M1, M2, - - - MN) for the credentials of the client device 110(1). Thus, the same authentication/security credentials (as part of security key exchange during initial authentication) of the client device 110(1) can be used for any of these MAC addresses. The same security keys can be used for encrypting the traffic sent using all of the MAC addresses that have been authorized for client device 110(1).

As shown at 202, the client device 110(1) has a physical MAC address M0 and an authentication identity C1 used for authentication, such as authentication according to the Extensible Authentication Protocol (EAP) of IEEE 802.1x. Assuming that the client device 110(1) is not associated to an AP, then at 204, the client device 110(1) sends a probe request. The probe request is received by AP 120(1) and the AP sends a probe response at 206.

After receiving the probe response, the client device 110(1) is now aware of AP 120(1) and at 208 sends an EAP-over-LAN (EAPOL)-start message to the AP 120(1) to initiate the authentication handshake process. In response to receiving the EAPOL-start message, at 210 the AP 120(1) sends an EAP-Request/Identity message to the client device 110(1). At 212, the client device 110(1) responds with an EAP-Response/Identity message and in this message, the client includes the EAP identity (C1). The physical MAC address M0 of the client device 110(1) is also included in any of the messages that the client device 110(1) sends to the AP 120(1) up to this point.

At 214, the AP 120(1) or WLC 130 sends to the management entity 150 a request for a set of MAC addresses for the client device 110(1). At 216, the management entity 150 generates or allocates a set of MAC addresses for the client device 110(1). More specifically, the management entity 150 registers the primary identity consisting of the authentication identity C1 and the physical MAC address M0 as the primary identity of the client device 110(1), and generates a set of MAC addresses that includes, for example, MAC addresses M1 and M2. The management entity 150 has visibility into the dynamically allocated MAC addresses currently in use by other client devices. Consequently, in generating the dynamic MAC addresses for client device 110(1), it can be sure not to use a MAC address already in use by another client device.

In addition, in one form, at 216, the management entity 150 may define policies for how each MAC address is to be used, such as which MAC address should be used for a particular service or application type/traffic flow type, e.g., M1 for voice, M2 for HTTP traffic, M3 for local client communication, M4 for remote client communication, etc. Thus, a policy may be defined to designate a purpose/function for each of the MAC addresses.

As indicated by the bi-directional arrow at 214, the management entity 150 returns to the AP 120(1) or WLC 130 the set of MAC addresses allocated/generated for the client device 110(1). In one form, the management entity 150 may also include in the communication to the client at 214, the information for the policies defining how each MAC address is to be used.

At 218, the AP 120(1) or WLC 130 may send a Remote Authentication Dial In User Service (RADIUS) access-request to the AAA server 160 that performs AAA management. At 220, the AAA server 160 returns a RADIUS access-challenge to the AP 120(1) or WLC 130.

At 222, the AP 120(1) or WLC 130 sends an EAP-request/authorization message to the client device 110(1). The client device 110(1) responds at 224 with an EAP-response/authorization message to the AP 120(1) or WLC 130. At 226, the 120(1) or WLC 130 sends a RADIUS access-request to the AAA server 160, and if the AAA server 160 determines that the client device 110(1) should be authorized, the AAA server 160 responds with a RADIUS access-accept message at 228. The AP 120(1) or WLC 130 then sends an EAP-success message at 230 to the client device 110(1). As part of the EAP-success message sent at 230, the AP 120(1) or WLC 130 may include an indication of the set of MAC addresses generated/allocated for the client device 110(1), e.g., that the client device 110(1) has an authenticated identity C1 with MAC addresses M0 (the physical MAC address) and MAC addresses M1 and M2, for example. At 232, the client device 110(1) stores information indicating its authenticated identity and dynamically allocated (short-lived) MAC addresses. Likewise, at 234, the AP 120(1) and/or WLC 130 stores information indicating that the client device 110(1) has an authenticated identity C1 with MAC addresses M0, M1 and M2. At 236, the AP 120(1) and/or WLC 130 provisions the Layer-2 policies (received from the management entity 150) for how each MAC address M0, M1 and M2 are to be used by the client device 110(1).

At 238, the AP 120(1) or WLC 130 sends to the client device 110(1) information for the policies defining how each MAC address M0, M1 and M2 are to be used by the client device 110(1). Alternatively, the AP 120(1) or WLC 130 may send this policy information as part of the EAP success sent to the client device 110(1) at 230.

Also, as shown at 240, the AAA server 160 may store information indicating the authenticated identity C1 and MAC addresses M0, M1 and M2 allocated for client device 110(1).

As an alternative to the management entity 150 defining the policies that determine how each MAC address should be used by the client device 110(1), the client device 110(1) may define the policies. The client device 110(1) may have a static policy that it uses to determine which MAC address is used for which type of traffic. In other words, it may be left to the client device 110(1) to decide how to use the MAC addresses.

The client device 110(1) can use any of the MAC addresses in that domain, and is expected to use a different MAC addresses for different types of flows/exchanges. Eavesdropper device 190 monitoring the packet flows in that Layer-2 domain will see randomly allocated MACs and will not be able to identify the user or draw correlations between the flows from the same user because the user is using different MAC addresses. It is also envisioned that the client device 110(1) may rotate a MAC address even for traffic of the same traffic type/flow type.

Reference is now made to FIG. 3B that forms a part of the process 200. At 242, the client device 110(1) sends an association request to AP 120(1) or WLC 130. At 244, the AP 120(1) responds with an association response. The client device 110(1) is now associated to the AP 120(1). As shown at 246, the client device 110(1) can use any of the MAC addresses M0, M1 and M2.

In the embodiment in which the client device 110(1) generates/defines the policies for how each MAC address M1 and M2 is to be used, then at 248, the client device 110(1) may send a message including this policy information to the AP 120(1) or WLC 130, which in turn forwards this to the management entity 150 at 249. In this way, the management entity 150 can register these policies for the MAC addresses used by the client device.

At 250, the client device 110(1) conducts a session with CN1 170 using MAC address M1 as its source MAC address. At 252, client device 110(1) conducts a data session with CN2 180 using MAC address M2 as its source address.

As shown at 260, there is no PII revealed to ED 190 in observing a relationship between MAC address M1 and MAC address M2, MAC address M1 to identity C1 or MAC address M2 to identity C1, used by client device 110(1) if ED 190 is monitoring flows 250 and 252.

At 270, the client device 110(1) may initiate an EAPOL-logoff to the AP 120(1) or WLC 130. Next, at 280, the AP 120(1) or WLC 130 communicates with the management entity 150 to remove the network state of the client device 110(1), release the secondary (dynamically allocated/short-lived) MAC addresses M1 and M2, de-authorize the primary identity C1 and MAC address M0 and the secondary MAC addresses M1 and M2. As a result, MAC addresses M1 and M2 may be used again for a different client device.

Approach-2: Client-Requested Dynamic MAC Address Usage

Figure 4:
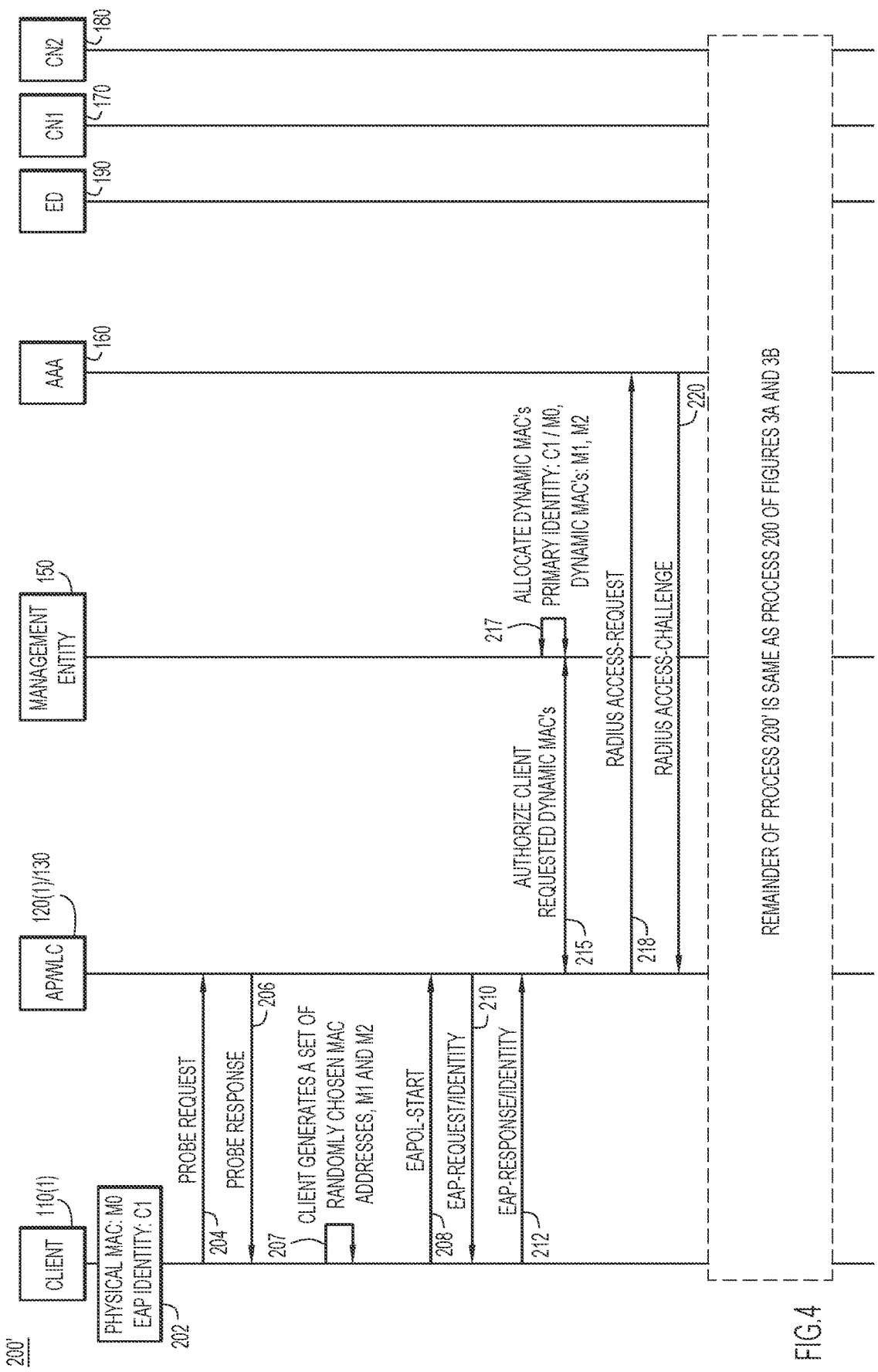
FIG. 4 illustrates a sequence diagram associated with a second approach for MAC address anonymization, according to an example embodiment.

Reference is now made to FIG. 4 which shows a message sequence for a process 200'. In this approach, the client device 110(1) randomly generates the MAC addresses (with the local bit set) and requests the network to authorize the usage of those MAC addresses. The process 200' is similar to process 200 shown in FIGS. 3A and 3B, except that at 207, the client device 110(1) generates a set of randomly chosen MAC addresses M1 and M2, for example. During the EAP exchanges 208, 210 and 212, the client device 110(1) communicates the set of randomly chosen MAC addresses to the AP 120(1) or WLC 130.

At 215, the AP 120(1) or WLC 130 communicate the set of randomly chosen MAC addresses M1 and M2 to the management entity 150 with a request to authorize those MAC addresses. At 217, the management entity 150 authorizes the MAC addresses M1 and M2 along with the primary identity C1 and physical MAC address M0, {C1, {M0, M1, M2, . . . M(N−1)}}. Thereafter, as in process 200 of FIGS. 3A and 3B, the AP 120(1) or WLC 130 conduct a RADIUS exchange with the AAA server 160, and as shown in FIG. 4, the remainder of the process 200' is the same as process 200 shown in FIGS. 3A and 3B.

If at 217, the management entity 150 determines, based on its knowledge of MAC addresses used by other devices in the network, that MAC addresses M1 and M2 are already in use, then the management entity 150 would generate a notification to be sent via the AP 120(1) to the client device 110(1) so that the client device 110(1) can generate new MAC addresses. The operations from 207-217 would repeat until the management entity 150 has determined there is no conflict with the MAC addresses generated by the client device, and the management entity 150 authorizes those MAC addresses.

Thus, in Approach 2, the client device 110(1) randomly generates the set of MAC addresses, instead of the management entity 150 generating them. This is somewhat similar to how a client can select an IPv6 address randomly as long as it does not see any traffic using that address in the network. At 217, the management entity 150 registers those MAC addresses for the client device 110(1). As described above in connection with FIGS. 3A and 3B, the management entity 150 or the client device may define the policy as to how the MAC addresses (that the client randomly generated) are used by the client device 110(1). The network elements, including the AP 120(1)/WLC 130 and AAA server 160 have the authenticated identity of the client device 110(1), its physical MAC address M0 and the dynamically allocated MAC addresses. Registering with the network in one sense provides a duplicate address detection (DAD) capability. The relation establishing an association between the authenticated identity and the allocated MAC's, {C1↔M0, M1, M2} is present at the client device 110(1), AP 120(1), WLC 130, management entity 150 and AAA server 160. The client can use any of the MAC addresses M1 and M2 in that domain.

Like process 200, in process 200' an eavesdropper 190 monitoring the packet flows in that Layer-2 domain will see randomly allocated MAC addresses and will not be able to identify the user or draw correlations between the flows from the same user but using different MAC addresses. Again, in Approach 2, there is intelligence on the client device 110(1) to randomly select the MAC addresses and then register them with the management entity 150, and the management entity 150 or the client device 110(1) may define/configure the policies for how those MAC addresses are to be used. In the embodiment in which the client device 110(1) defines the policies for how the MAC addresses are to be used, then the client device 110(1) may convey that information to the management entity 150 as shown at 248 and 249 in FIG. 3B.

Approach-3: Client-Unaware Dynamic MAC Address Usage

Figure 5:
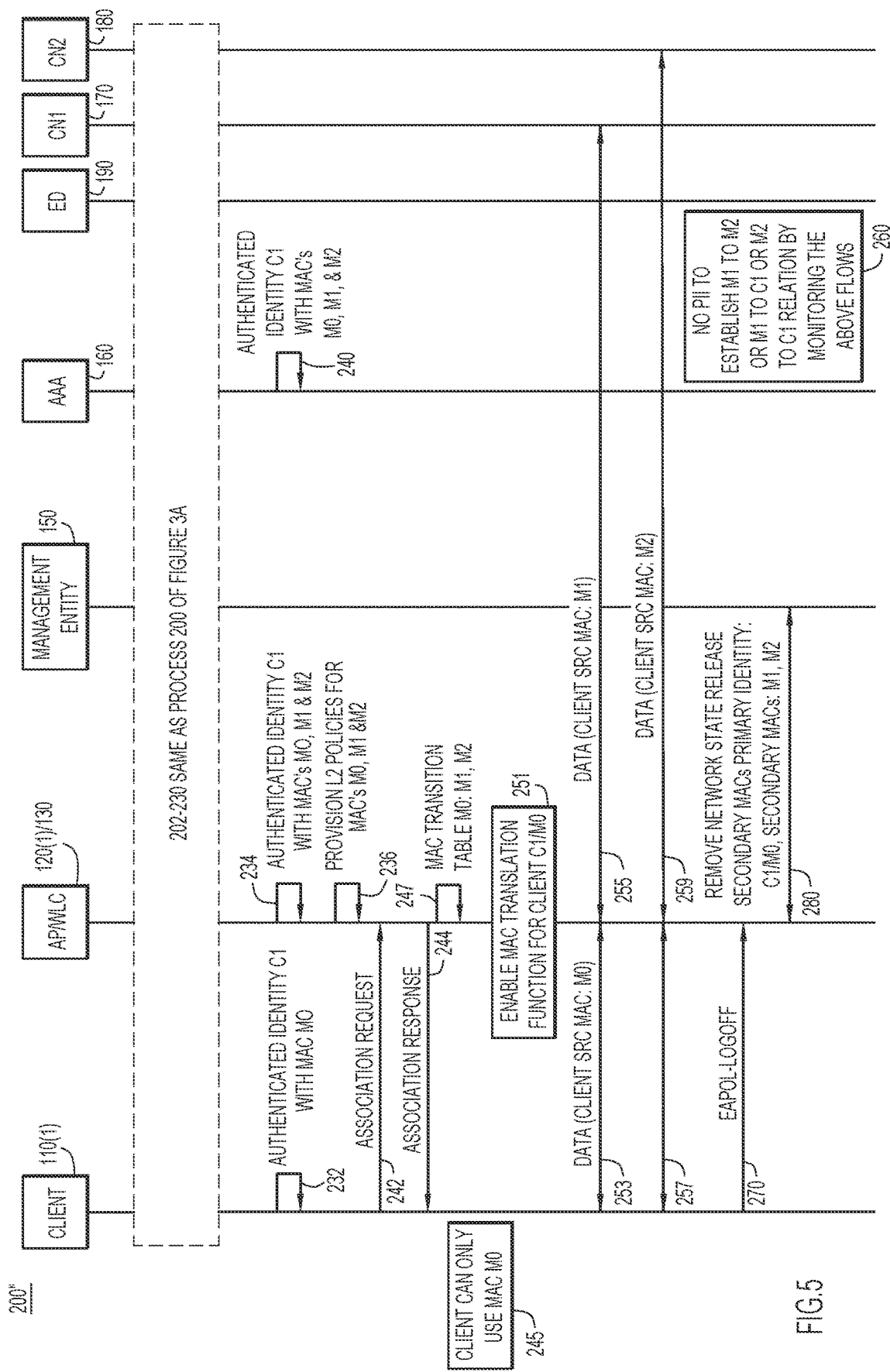
FIG. 5 illustrates a sequence diagram associated with a third approach for MAC address anonymization, according to an example embodiment.

Reference is now made to FIG. 5 for a description of a third approach in which the client is unaware of the dynamic MAC address usage. In this approach, the client device 110(1) operates in a legacy mode, and will always use the physical MAC address M0, but the AP 120(1) or WLC 130 replaces the physical MAC address M0 with a dynamically allocated (short-lived) MAC address for that user. The policy of MAC selection may be an algorithm based on the flow metadata. Any of the APs 120(1)-120(1) are able to allocate the same MAC for a given flow. The relation establishing an association between the authenticated identity and the allocated MAC's, {C1χM0, M1, M2} is present at the AP 120(1), WLC 130, management entity 150 and AAA server 160. The client device 110(1) can use any of the MAC addresses in that domain. An eavesdropper monitoring the packet flows in that Layer-2 domain will see randomly allocated MAC addresses and will not be able to identify the user or draw correlations between the flows from the same user but using different MAC addresses.

More specifically, after EAP success 230, at 232 the client device 110(1) is authenticated with identity C1 but only for physical MAC address M0. However, the AP 120(1) or WLC at 234 authenticates client device identity C1 with MAC addresses M0, M1 and M2, where M1 and M2 were generated/allocated by the management entity 150. Through the RADIUS Access-Request and RADIUS Access-Accept exchange at 226 and 228 (of FIG. 3A, at 240, the AAA server 160 stores information indicating the authenticated identity C1 and MAC addresses M0, M1, and M2 for client device 110(1), as described above in connection with FIG. 3A. The AP also provisions the usage policies (generated by the management entity 150) for MAC addresses M0, M1 and M2 for the client device 110(1). As indicated at 245, the client device 110(1) can only use physical MAC address M0.

At 247, the AP 120(1) or WLC 130 generates a MAC translation table to translate the MAC address M0 of the client device 110(1) to one of the MAC addresses M1 or M2 in the set of MAC addresses dynamically allocated by the management entity 150 for client device 110(1). For example, Table 1 below may determine which MAC addresses in the set of allocated MAC addresses (M1 or M2) is to be used based on the flow/application type. Table 1 is only an example.

TABLE 1

| Destination or Flow Type | Source MAC Address for Client (C1/M0) |
|---|---|
| Voice | M1 |
| HTTP | M2 |

At 251, the AP enables the MAC translation function for client device 110(1) based on the authenticated identity C1.

At 253, the client device 110(1) initiates a session with CN1 170. In one example, this session is a voice session. Using a table like Table 1, the AP 120(1) or WLC 130 translates the source MAC address M0 to MAC address M1, and at 255 forwards the communication to CN1 170.

At 257, the client device 110(1) initiates a session with CN2 180. In one example, this session is an HTTP session. According to Table 1, the AP 120(1) or WLC 130 translates the source MAC address M0 to MAC address M2, and at 259, forwards the communication to CN2 180.

When the AP 120(1) or WLC 130 performs the translation between the physical MAC address M0 and the allocated MAC address M1 (in the course of operations 253 and 255) and the allocated MAC address M2 (in the course of operations 257 and 259), it is to be understood that the translating is performs in both directions. That is, for a communication provided by the client device 110(1) that is received by the AP 120(1) or WLC 130, the AP 120(1) or WLC 130 translates the source MAC address M0 to the allocated MAC address M1 (or M2) before forwarding that communication on to CN1 (or CN2). In the other direction, the AP 120(1) or WLC 130 translates the destination MAC M1 address (or M2) contained in a communication received from CN1 (or CN2) to the physical MAC address M0 of client device 110(1) before forwarding that communication on to the client device 110(1).

Thus, in general, the AP 120(1) or WLC 130 performs operations of: obtaining the plurality of MAC addresses from the management entity 150 (at operation 214 shown in FIG. 3A), wherein the plurality of MAC addresses are all authorized against an authentication identity associated with the client device; generating translation data (at 247 in FIG. 5) used for translating a physical MAC address of the client device to a particular one of the plurality of MAC addresses based on a type or an application of a session involving the client device; obtaining a packet for a communication session between the client device and a correspondence node; and for the packet, translating between the physical MAC address of the client device and one of the plurality of MAC addresses based on the translation data and a session type or an application associated with the session involving the client device.

As is the case with process 200 and 200', in process 200", there is no PII to establish a relationship between MAC addresses M1 and M2, or MAC address M1 or M2 to authenticated identity C1 that could be revealed to ED 190.

EAPOL-logoff occurs at 270 and removal of network state occurs at 280, in the manner described above in connection with FIG. 3B.

In summary, Approach-1 is a network-based approach where some intelligence is provided at management entity 150 for supporting the MAC anonymization capability. This approach also involves some intelligence/capability added on a client device and consequently involves suitably enabled IEEE 802.11 driver in the client device. Approach-2 is a client-based approach where the client device is responsible for generating the anonymous addresses and registering with the network. Similar to Approach-1, Approach-2 involves a suitably enabled IEEE 802.11 driver in the client device.

Approach-3 is about supporting legacy clients and does not involve any change on a client device. Given the potential long device upgrade cycle, Approach-3 may coexist with Approach-1 and Approach-2.

Figure 6:
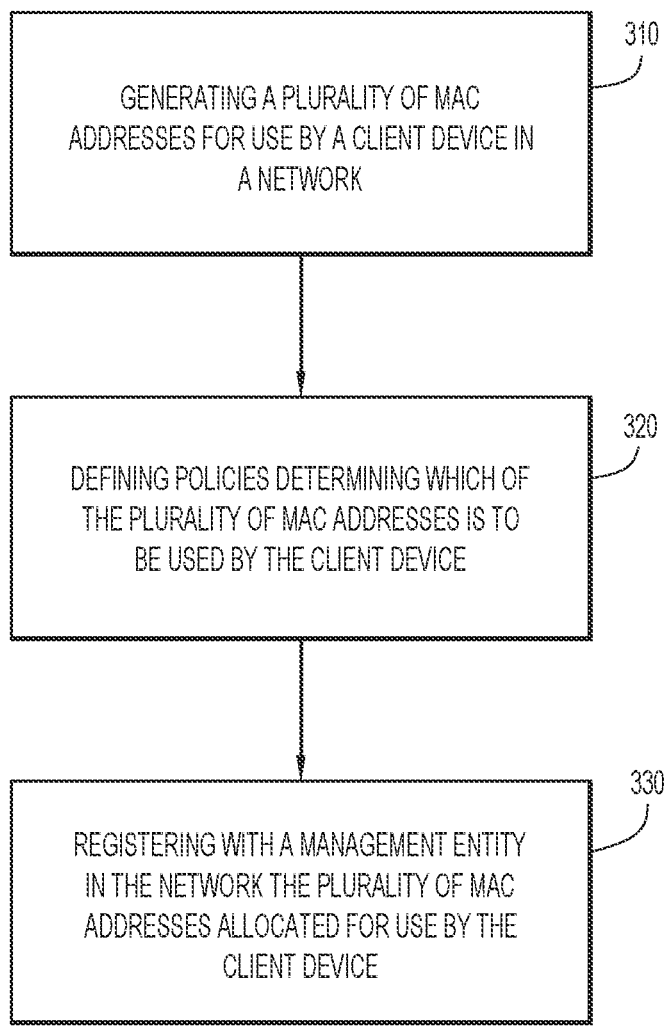
FIG. 6 is a flow chart depicting a MAC address anonymization method, according to an example embodiment.

Reference is now made to FIG. 6 for description of a method 300 according to the embodiments presented herein. Reference is also made to FIGS. 1, 3A, 3B, 4 and 5 for purposes of the description of FIG. 6.

At 310, a plurality of MAC addresses are generated allocated for use by client device in a network. Operation 310 may be performed by a management entity or by the client device.

At 320, policies are defined that determine which one of the plurality of MAC addresses is to be used by the client device. Again, these policies may be defined by a management entity or by the client device.

At 330, the plurality of MAC addresses allocated for use by the client device are registered with a management entity.

In the embodiment in which the management entity generates the plurality of MAC address, the method 300 may further include additional operations. For example, in one form as described above in connection with FIGS. 3A and 3B, the method 300 may further include at an access point in communication with the client device or a wireless network controller in communication with the access point: obtaining the plurality of MAC addresses from the management entity, wherein the plurality of MAC addresses are all authorized against an authentication identity associated with the client device; and providing the plurality of MAC addresses to the client device as part of a security/authentication exchange in an encrypted message to the client device. In another form as described above in connection with FIG. 5, the method 300 may further include at an access point in communication with the client device or a network controller in communication with the access point: obtaining the plurality of MAC addresses from the management entity, wherein the plurality of MAC addresses are all authorized against an authentication identity associated with the client device; generating translation data used for translating a physical MAC address of the client device to a particular one of the plurality of MAC addresses based on a type or an application of a session involving the client device; and obtaining a communication for a session between the client device and a correspondence node; translating between the physical MAC address of the client device and one of the plurality of MAC addresses based on the translation data and a type or an application of the session involving the client device.

In the embodiment in which the client device generates the plurality of MAC addresses, the method 300 may further include, as described above in connection with FIG. 4, the client device providing to the management entity information indicating the plurality of MAC addresses for registering the plurality of MAC addresses with the management entity.

Furthermore, the operation of defining the policies may be performed either at the management entity or at the client device. When the management entity defines the policies, then the method 300 further includes the management entity providing to the client device information describing the policies. When the client device defines the policies, then the method 300 further includes the client device providing to the management entity information describing the policies. Moreover, the policies may determine which of the plurality of MAC addresses to use based on service or application type or traffic flow type.

Thus, in one form, operations 310, 320 and 330 may be performed by the client device, and in another form, these same operations 310, 320 and 330 may be performed by the management entity.

As explained above, the set of a plurality of MAC addresses are short-lived, meaning they are intended for short-term use by the client device. Upon the client device logging off from the network (e.g., EAPOL-logoff), the management entity is notified and it de-authorizes that set of MAC addresses. Thereafter, those MAC addresses can be allocated for short-term use by another client device when needed.

The operations of method 300 (i.e., the generating operation 310, defining operation 320 and registering operation 330) may be enabled and disabled on a basis of one or more of: local area network (LAN) segment of the network, AP operating in the network, or application traffic type.

Figure 7:
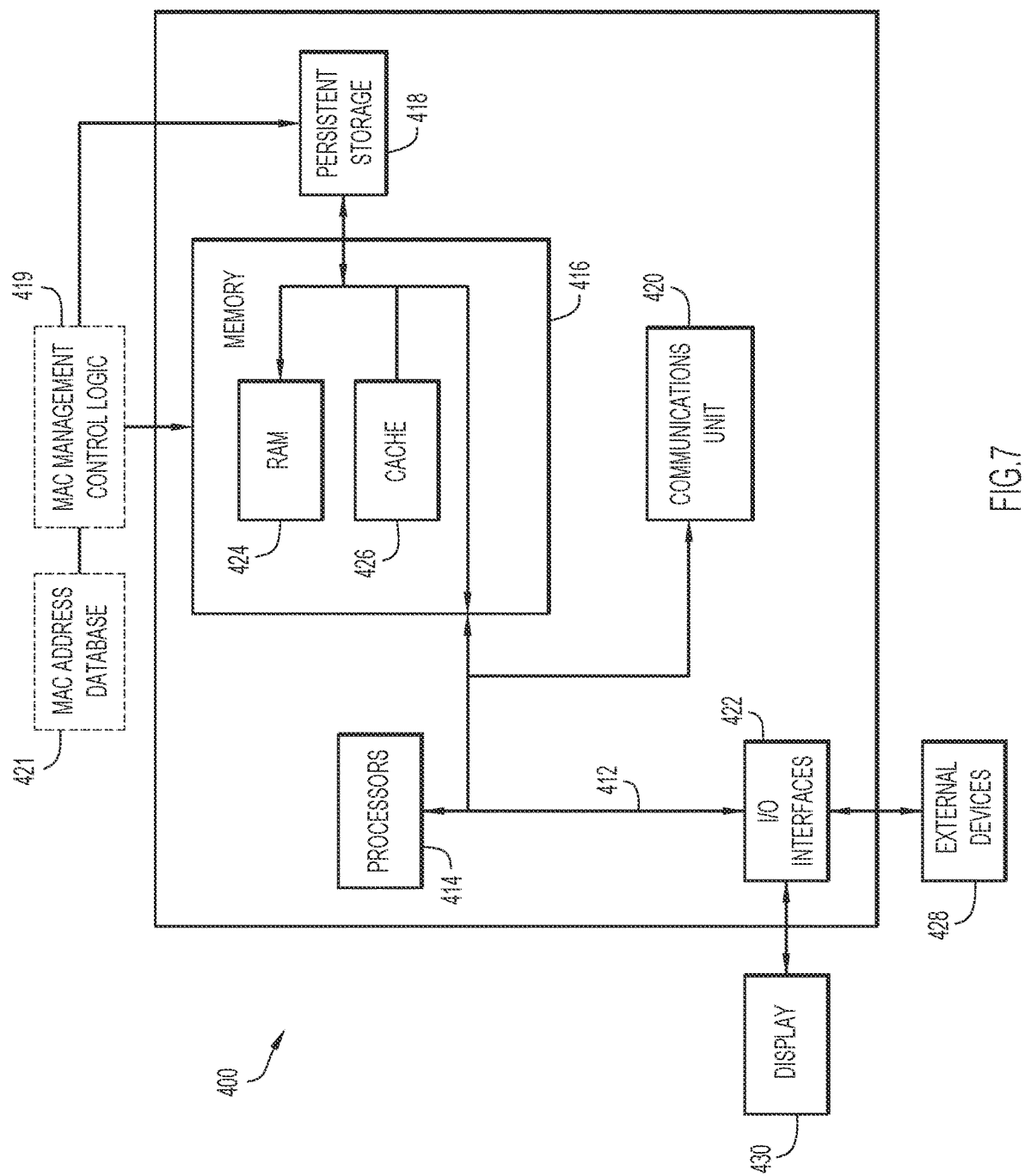
FIG. 7 is a block diagram of a computing apparatus that may perform the management entity functions or network controller functions of the MAC address anonymization techniques, according to an example embodiment.

Reference is now made to FIG. 7. FIG. 7 illustrates a hardware block diagram of a computing device 400 that may serve perform the functions of any of the servers or computing or control entities referred to herein, such as the management entity 150 and the WLC 130. It should be appreciated that FIG. 7 provides only an illustration of one embodiment and does not imply any limitations with regard to the environments in which different embodiments may be implemented. Many modifications to the depicted environment may be made.

As depicted, the device 400 includes a bus 412, which provides communications between processor(s) 414, memory 416, persistent storage 418, communications unit 420, and input/output (I/O) interface(s) 422. Bus 412 can be implemented with any architecture designed for passing data and/or control information between processors (such as microprocessors, communications and network processors, etc.), system memory, peripheral devices, and any other hardware components within a system. For example, bus 412 can be implemented with one or more buses.

Memory 416 and persistent storage 418 are computer readable storage media. In the depicted embodiment, memory 416 includes random access memory (RAM) 424 and cache memory 426. In general, memory 416 can include any suitable volatile or non-volatile computer readable storage media. Instructions for MAC management control logic 419 may be stored in memory 416 or persistent storage 418 for execution by processor(s) 414 such that, when the processor(s) executes the MAC management control logic 419, the device 400 is operable to perform the functions of the management entity 150 described herein or the functions of the WLC 130 described herein.

In addition, in the case in which the device 400 serves as the management entity 150, the MAC management control logic 419 stores and manages stored data, e.g. a MAC address database 421, in memory 416 or persistent storage 418, that lists all of the dynamically allocated MAC addresses currently in use by client devices. This allows the management entity 150 to generate a set of MAC addresses for a client device without causing a conflict with any MAC addresses currently in use.

One or more programs may be stored in persistent storage 418 for execution by one or more of the respective computer processors 414 via one or more memories of memory 416. The persistent storage 418 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 418 may also be removable. For example, a removable hard drive may be used for persistent storage 418. Other examples include optical and magnetic disks, thumb drives, and smart cards that are inserted into a drive for transfer onto another computer readable storage medium that is also part of persistent storage 418.

Communications unit 420, in these examples, provides for communications with other data processing systems or devices. In these examples, communications unit 420 includes one or more network interface cards. Communications unit 420 may provide communications through the use of either or both physical and wireless communications links.

I/O interface(s) 422 allows for input and output of data with other devices that may be connected to computer device 400. For example, I/O interface 422 may provide a connection to external devices 428 such as a keyboard, keypad, a touch screen, and/or some other suitable input device. External devices 428 can also include portable computer readable storage media such as database systems, thumb drives, portable optical or magnetic disks, and memory cards.

Software and data used to practice embodiments can be stored on such portable computer readable storage media and can be loaded onto persistent storage 418 via I/O interface(s) 422. I/O interface(s) 422 may also connect to a display 430. Display 430 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to contact center interaction routing). The database system may be implemented by any number of any conventional or other databases, data stores or storage structures (e.g., files, databases, data structures, data or other repositories, etc.) to store information (e.g., data relating to contact center interaction routing). The database system may be included within or coupled to the server and/or client systems. The database systems and/or storage structures may be remote from or local to the computer or other processing systems, and may store any desired data (e.g., data relating to contact center interaction routing).

The present embodiments may employ any number of any type of user interface (e.g., Graphical User Interface (GUI), command-line, prompt, etc.) for obtaining or providing information (e.g., data relating to providing enhanced delivery options), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
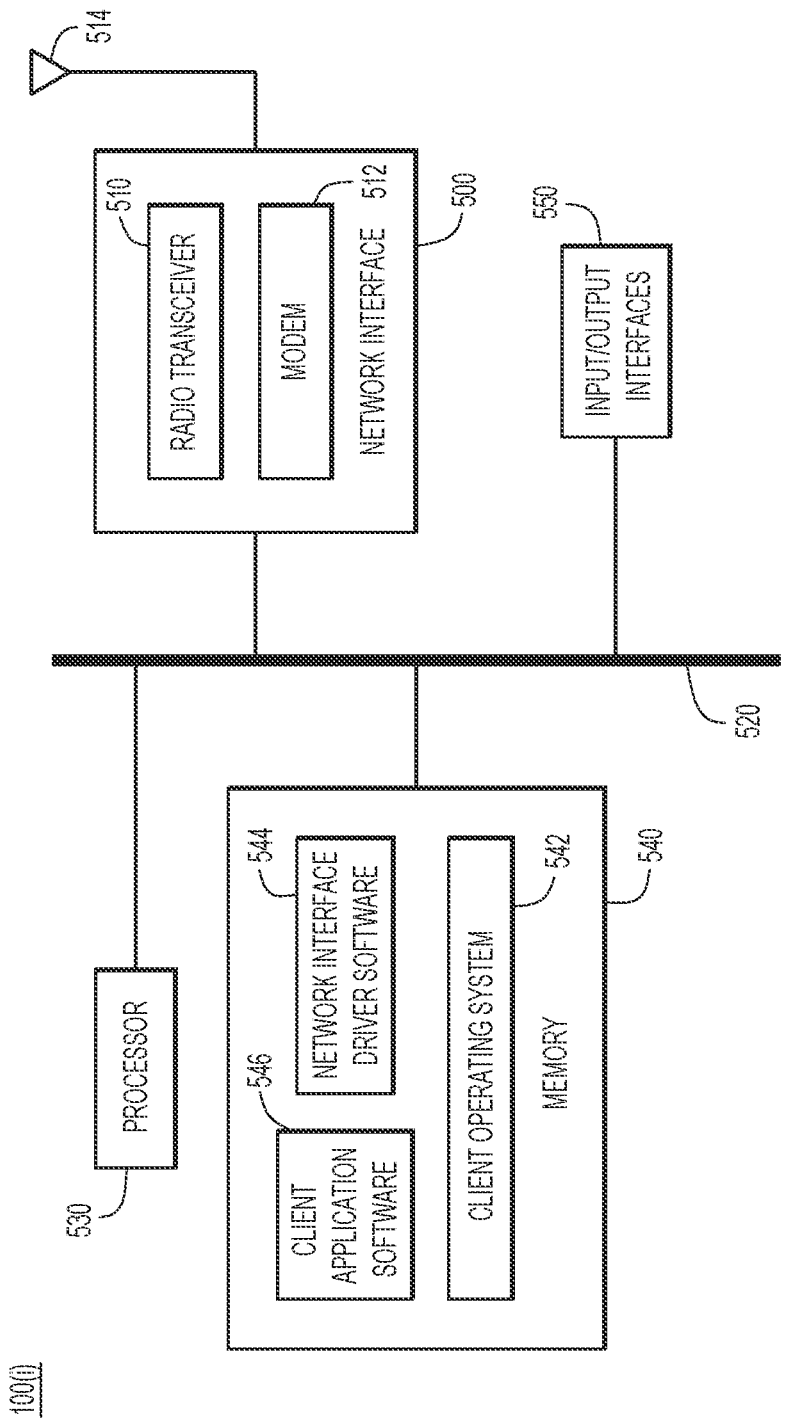
FIG. 8 is a block diagram of a client device configured to perform the client device functions of the MAC address anonymization techniques, according to an example embodiment.

Referring now to FIG. 8, a block diagram is shown of a client device 110(*i*) configured to perform the client device based operations presented herein. The block diagram of FIG. 8 of client device 110(*i*) is meant to be generally representative of any of the client devices 110(1)-110(P) shown in FIG. 2, and described herein. The client device 110(*i*) includes a network interface 500 that includes a radio transceiver 510 and a modem 512. The network interface 500 may be a wired or wireless network interface. In the case in which the network interface 500 is a wireless interface, at least one antenna 514 is provided that is connected to the network interface 500. The radio transceiver 510 performs the radio frequency (RF) transmission and receiving functions, and the modem 512 performs the baseband modulation and demodulation functions, as well as MAC control functions. In the case in which the network interface 500 is a wireless network interface, it may be embodied by one or more chip sets designed/configured to comply with a wireless local area network standard, such as IEEE 802.11, or any variation thereof, or any other similar standard hereinafter developed. Similarly, in the case in which the network interface 500 is a wired Ethernet interface, then it may be embodied by one or more chip sets configured to comply with an Ethernet or other networking standard.

A bus 520 is provided that connects to the network interface 500. A processor (or multiple instances of a processor) 530 is provided. The processor 530 is also connected to bus 520 and may be a microprocessor or microcontroller. The processor 530 is configured to execute instructions stored in memory 540. The memory 540 stores software instruction for a client operating system 542, network interface driver software 544 for the network interface 500, and client application software 546 for one or more client applications that are running on client device 110(*i*). The processor 530 and memory 540 may take any of the forms described herein in connection with FIG. 7. The network interface driver software 544 is configured or updated to perform the client device operations described herein in connection with FIGS. 3A, 3B and 4.

The client device may also include input/output interface 550, such as Universal Serial Bus (USB) interfaces, display interfaces to display devices, etc.

Figure 9:
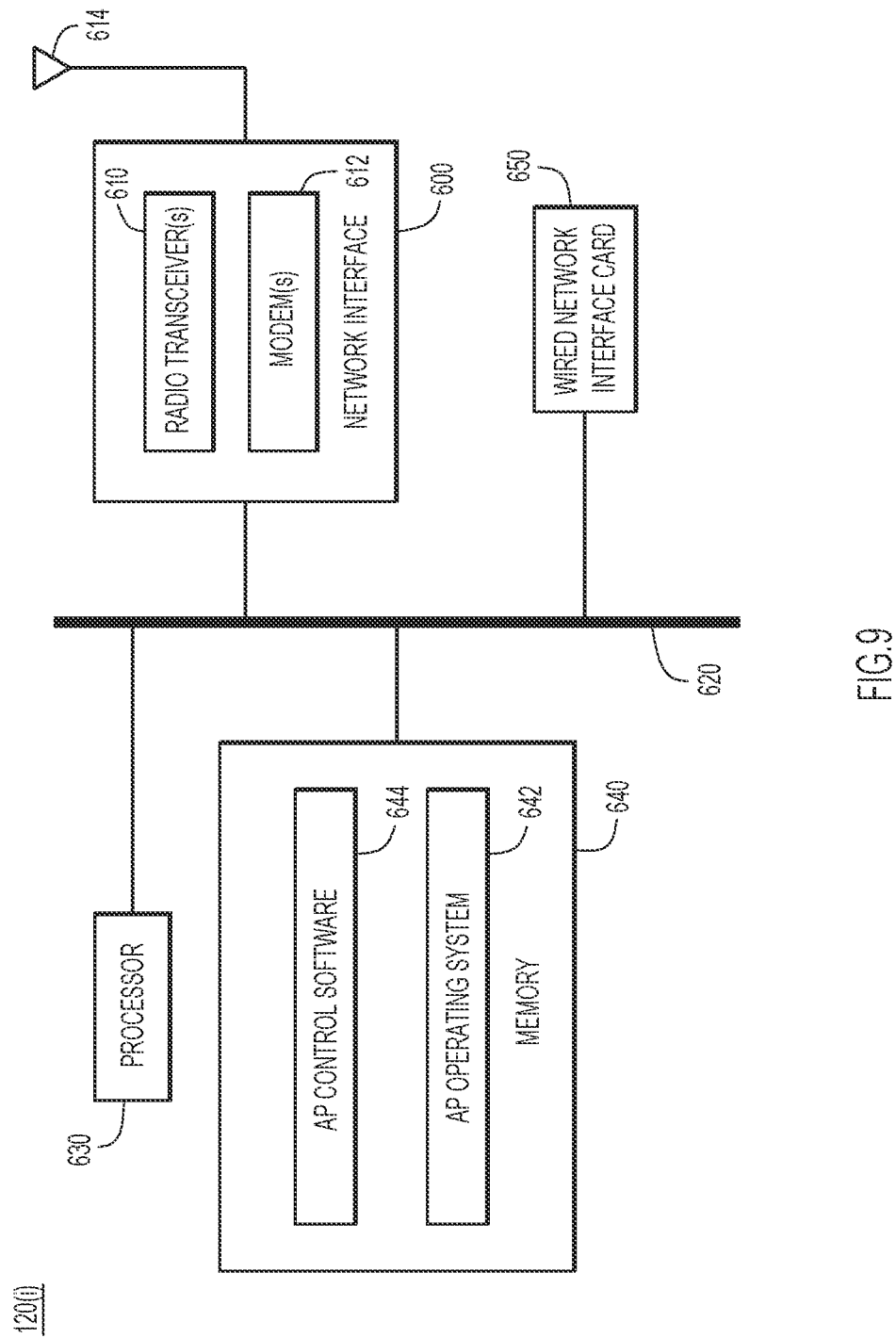
FIG. 9 is a block diagram of an access point configured to perform the access point functions of the MAC address anonymization techniques, according to an example embodiment.

Reference is now made to FIG. 9. FIG. 9 shows a block diagram of an AP 120(*i*) configured to perform the AP operations described herein, such as those depicted in FIG. 5. The block diagram of FIG. 9 of AP 120(*i*) is meant to be generally representative of any of the APs 120(1)-120(Q) shown in FIG. 2, and described herein. The AP 120(*i*) includes a wireless network interface 600 that includes one or more radio transceivers 610 and one or more modems 612, and is connected to at least one antenna 614. The radio transceiver 610 performs the RF transmission and receiving functions, and the modem 612 performs the baseband modulation and demodulation functions, as well as MAC control functions. The wireless network interface 600 may be embodied by one or more chip sets designed/configured to comply with a wireless local area network standard, such as IEEE 802.11, or any variation thereof, or any other similar standard hereinafter developed. In the case where the AP simultaneously supports multiple channel services, then there would be an instance of a radio transceiver 610 and a modem 612 for each channel to be served.

A bus 620 is provided that connects to the wireless network interface 600. A processor (or multiple instances of a processor) 630 is provided. The processor 630 is also connected to bus 620 and may be a microprocessor or microcontroller. The processor 630 is configured to execute instructions stored in memory 640. The memory 640 stores software instruction for an AP operating system 642 and AP control software 644 for the wireless network interface 600. The processor 630 and memory 640 may take any of the forms described herein in connection with FIG. 7. The AP control software 644 is configured to cause the AP to perform the AP operations described herein in connection with FIG. 5.

In the case in which the AP 120(*i*) is a network switch, then it is understood that there would not be a wireless network interface 600 and a wired network interface card 650. Instead, the AP (form of network switch) would include a plurality of ports and a switch processor board/component that is coupled to the plurality of network ports to receive a network cable. The switch processor board/component connects to the plurality of network ports and to the bus 620.

In summary, a MAC address is a key PII element of a network (wired or wireless) user. There are a number of tools available in the market for tracking users based on long-lived MAC addresses. The techniques presented herein address this key privacy threat by the removal of long-lived MAC addresses in user flows and allowing usage of a unique MAC address on a flow, application, destination, and network basis.

These techniques do impact legacy applications such as MAC-Transparent Auto Login (TAL) and other subscriber management and policy features that assume a stable MAC address and incorrectly assume the user never changes the MAC address of his/her device. Such legacy features are not secure and are already broken. Transitioning such capabilities and relying on authenticated identities as opposed to long-lived MAC addresses has useful benefits. Finally, it is to be understood that it is not a goal of the embodiments presented herein to hide correlation of client MAC addresses from the infrastructure elements such as the WLC, AAA server, and APs.

In one form, a method is provided that includes: generating a plurality of media access control (MAC) addresses allocated for use by a client device in a network; defining policies determining which one of the plurality of MAC addresses is to be used by the client device; and registering with a management entity in the network the plurality of MAC addresses allocated for use by the client device.

The generating operation may be performed by the management entity, in one form. Moreover, the method may further, at an access point in communication with the client device or a network controller in communication with the access point: obtaining the plurality of MAC addresses from the management entity, wherein the plurality of MAC addresses are all authorized against an authentication identity associated with the client device; and providing the plurality of MAC addresses to the client device as part of a security/authentication exchange in an encrypted message to the client device. In another form, the method may further include, at an access point in communication with the client device or a network controller in communication with the access point: obtaining the plurality of MAC addresses from the management entity, wherein the plurality of MAC addresses are all authorized against an authentication identity associated with the client device; generating translation data used for translating a physical MAC address of the client device to a particular one of the plurality of MAC addresses based on a type or an application of a session involving the client device; obtaining a packet for a communication session between the client device and a correspondence node; and for the packet, translating between the physical MAC address of the client device and one of the plurality of MAC addresses based on the translation data and a session type or an application associated with the session involving the client device.

In one form, the generating is performed by the client device, and the method further includes the client device providing to the management entity information indicating the plurality of MAC addresses for registering the plurality of MAC addresses with the management entity.

The defining operation may be performed at the management entity, and the management entity provides to the client device information describing the policies.

In still another form, the defining operation may be performed at the client device, and the method further includes the client device providing to the management entity information describing the policies.

The policies may determine which of the plurality of MAC addresses the client device is to use based on service or application type or traffic flow type. Moreover, the plurality of MAC addresses may be intended for short-term use, and the method may further include de-authorizing of the plurality of MAC addresses upon logoff of the client device from the network. In one form, the plurality of MAC addresses may be associated with an authentication identity and a physical MAC address of the client device.

In one form, the generating, defining and registering operations are enabled and disabled on a basis of one or more of: local area network (LAN) segment of the network, access point operating in the network, or application traffic type.

In still another form, an apparatus is provided a network interface configured to enable communications in a network; and a processor coupled to the network interface, wherein the processor is configured to: obtain from an access point in communication with a client device or a network controller in communication with the access point, an identity of the client device; obtain an indication of authentication of the identity of the client device; authorize a plurality of Media Access Control (MAC) addresses for use by the client device; and provide to the access point or the network controller an indication of authorization of the plurality of MAC addresses for the client device.

In still another form, an apparatus is provided comprising: a network interface configured to enable communications in a network; and a processor coupled to the network interface, wherein the processor is configured to: establish communication with an access point; provide to the access point an identity; receive from the access point an indication of authorization of a plurality of Media Access Control (MAC) addresses for use in the network, the indication of authorization being provided by a management entity based on authentication of the identity; and select one of the plurality of MAC addresses for communicating via the access point to a correspondence node in the network.

In yet another form, one or more non-transitory computer readable storage media are provided, encoded with instructions that, when executed by a processor, cause the processor to perform operations including: generating a plurality of media access control (MAC) addresses for use by a client device in a network; defining policies determining which one of the plurality of MAC addresses is to be used by the client device; and registering with a management entity in the network the plurality of MAC addresses allocated for use by the client device.

In still another form, one or more non-transitory computer readable storage media are provided, encoded with instructions that, when executed by a processor, cause the processor to perform operations including: establishing communication with an access point; providing to the access point an identity; receiving from the access point an indication of authorization of a plurality of Media Access Control (MAC) addresses for use in the network, the indication of authorization being provided by a management entity based on authentication of the identity; and selecting one of the plurality of MAC addresses for communicating via the access point to a correspondence node in the network.

In yet another form, one or more non-transitory computer readable storage media are provided, encoded with instructions that, when executed by a processor, cause the processor to perform operations including: obtaining from an access point in communication with a client device or a network controller in communication with the access point, an identity of the client device; obtaining an indication of authentication of the identity of the client device; authorizing a plurality of Media Access Control (MAC) addresses for use by the client device; and providing to the access point or the network controller an indication of authorization of the plurality of MAC addresses for the client device.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    generating, by a management entity, a plurality of media access control (MAC) addresses allocated for use by a client device in a network;
    defining at least one policy determining which one of the plurality of MAC addresses is to be used by the client device, wherein the policy defines when each MAC address of at least some of the plurality of MAC addresses is to be used; and
    providing, via the network, the plurality of MAC addresses, from the management entity to the client device.

2. The method of claim 1, wherein providing the plurality of MAC addresses includes:
    generating a secure envelope for the plurality of the MAC addresses; and
    providing the plurality of MAC addresses in the secure envelope.

3. The method of claim 1, further comprising:
    obtaining, from the client device, a connection request for establishing a connection to the network; and
    performing an authentication of the client device for establishing the connection to the network, wherein the plurality of MAC addresses are provided as part of the authentication of the client device.

4. The method of claim 1, further comprising:
    encrypting the plurality of MAC addresses using a security key for providing to the client device.

5. The method of claim 1, further comprising:
    performing an authentication of the client device for establishing a connection to the network, based an extensible authentication protocol, wherein the plurality of MAC addresses are provided during the authentication.

6. The method of claim 1, wherein providing the plurality of MAC addresses further includes:
    providing, to the client device, together with the plurality of MAC addresses, the at least one policy that defines using different MAC addresses of the plurality of MAC addresses based on one or more of: an application type, a service type, or time.

7. The method of claim 1, wherein the plurality of MAC addresses are intended for short-term use, and further comprising:
    de-authorizing of the plurality of MAC addresses upon logoff of the client device from the network.

8. The method of claim 1, further comprising:
    associating the plurality of MAC addresses with an authentication identity and a physical MAC address of the client device.

9. The method of claim 1, further comprising:
    generating translation data used for translating a physical MAC address of the client device to a particular one of the plurality of MAC addresses based on the at least one policy.

10. An apparatus comprising:
    a network interface configured to enable communications in a network; and
    a processor coupled to the network interface, wherein the processor is configured to:
        generating a plurality of media access control (MAC) addresses allocated for use by a client device in the network;
        defining at least one policy determining which one of the plurality of MAC addresses is to be used by the client device, wherein the policy defines when each MAC address of at least some of the plurality of MAC addresses is to be used; and
        providing, via the network, the plurality of MAC addresses, to the client device, wherein the apparatus is a management entity.

11. The apparatus of claim 10, wherein the processor is configured to provide the plurality of MAC addresses by:
    generating a secure envelope for the plurality of the MAC addresses; and
    providing the plurality of MAC addresses in the secure envelope.

12. The apparatus of claim 10, wherein the processor is further configured to perform:
    obtaining, from the client device, a connection request for establishing a connection to the network; and
    performing an authentication of the client device for establishing the connection to the network, wherein the plurality of MAC addresses are provided as part of the authentication of the client device.

13. The apparatus of claim 10, wherein the processor is further configured to perform:
    encrypting the plurality of MAC addresses using a security key for providing to the client device.

14. The apparatus of claim 10, wherein the processor is further configured to perform an operation comprising:
    performing an authentication of the client device for establishing a connection to the network, based an extensible authentication protocol, wherein the plurality of MAC addresses are provided during the authentication.

15. The apparatus of claim 10, wherein the processor is configured to provide the plurality of MAC addresses by:
    providing, together with the plurality of MAC addresses, the at least one policy that defines using different MAC addresses of the plurality of MAC addresses based on one or more of: an application type, a service type, or time.

16. The apparatus of claim 10, wherein the processor is further configured to perform an operation comprising:
generating translation data used for translating a physical MAC address of the client device to a particular one of the plurality of MAC addresses based on the at least one policy.

17. One or more non-transitory computer readable storage media encoded with instructions that, when executed by a processor, cause the processor to execute a method comprising:
generating a plurality of media access control (MAC) addresses allocated for use by a client device in a network;
defining at least one policy determining which one of the plurality of MAC addresses is to be used by the client device, wherein the policy defines when each MAC address of at least some of the plurality of MAC addresses is to be used; and
providing, via the network, the plurality of MAC addresses, from a management entity to the client device.

18. The one or more non-transitory computer readable storage media of claim 17, wherein providing the plurality of MAC addresses includes:
generating a secure envelope for the plurality of the MAC addresses; and
providing the plurality of MAC addresses in the secure envelope.

19. The one or more non-transitory computer readable storage media of claim 17, wherein the method further comprises:
obtaining, from the client device, a connection request for establishing a connection to the network; and
performing an authentication of the client device for establishing the connection to the network, wherein the plurality of MAC addresses are provided as part of the authentication of the client device.

20. The one or more non-transitory computer readable storage media of claim 17, wherein the method further comprises:
encrypting the plurality of MAC addresses using a security key for providing to the client device.

* * * * *